United States Patent
Tan

(10) Patent No.: US 10,105,844 B2
(45) Date of Patent: Oct. 23, 2018

(54) SYSTEM AND METHOD FOR CONTROLLING ROBOTIC MACHINE ASSEMBLIES TO PERFORM TASKS ON VEHICLES

(71) Applicant: General Electric Company, Schenectady, NY (US)

(72) Inventor: Huan Tan, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 105 days.

(21) Appl. No.: 15/183,850

(22) Filed: Jun. 16, 2016

(65) Prior Publication Data

US 2017/0361461 A1    Dec. 21, 2017

(51) Int. Cl.
*B25J 9/16* (2006.01)
*B25J 13/08* (2006.01)
(Continued)

(52) U.S. Cl.
CPC .............. *B25J 9/1661* (2013.01); *B25J 5/00* (2013.01); *B25J 5/007* (2013.01); *B25J 9/1633* (2013.01);
(Continued)

(58) Field of Classification Search
CPC ...... B25J 9/1697; B25J 13/085; B25J 9/1664; B25J 11/005; B25J 13/088; B25J 5/007;
(Continued)

(56) References Cited

U.S. PATENT DOCUMENTS 5,531,337 A * 7/1996 Cappelletti .............. B61G 7/04
213/211
8,140,250 B2 * 3/2012 Mian .................. B61L 27/0094
104/26.1
(Continued)

FOREIGN PATENT DOCUMENTS

CN    201694209 U    1/2011
CN    203600262 U    5/2014
(Continued)

OTHER PUBLICATIONS

Kehoe et al.; Cloud-based robot grasping with the google object recognition engine; Robotics and Automation (ICRA), 2013; pp. 4263-4270.
(Continued)

*Primary Examiner* — Jason Holloway
(74) *Attorney, Agent, or Firm* — GE Global Patent Operation; Pabitra Chakrabarti

(57) ABSTRACT

A robotic machine assembly includes a movable robotic arm configured to perform an assigned task that involves moving toward, engaging, and manipulating a target object of a vehicle. The assembly also includes a communication circuit configured to receive manipulation parameters for the target object from a remote database. The manipulation parameters are specific to at least one of the vehicle or a vehicle class in which the vehicle belongs. The assembly also includes one or more processors configured to generate a task performance plan for the robotic arm based on the manipulation parameters. The task performance plan includes prescribed forces to be exerted by the robotic arm on the target object to manipulate the target object. The one or more processors also are configured to drive movement of the robotic arm during performance of the assigned task according to the task performance plan.

20 Claims, 5 Drawing Sheets

(51) Int. Cl.
*B25J 19/02* (2006.01)
*B25J 5/00* (2006.01)
*B25J 13/00* (2006.01)

(52) U.S. Cl.
CPC ........... *B25J 13/006* (2013.01); *B25J 13/085* (2013.01); *B25J 19/021* (2013.01); *B25J 19/023* (2013.01); *B25J 9/162* (2013.01); *B25J 9/1664* (2013.01); *B25J 9/1697* (2013.01); *B25J 13/088* (2013.01); *G05B 2219/39329* (2013.01); *Y10S 901/01* (2013.01); *Y10S 901/09* (2013.01)

(58) Field of Classification Search
CPC ........ B25J 19/021; B25J 9/162; B25J 9/1661; B60T 15/048
See application file for complete search history.

(56) References Cited

U.S. PATENT DOCUMENTS

| | | | | |
|---|---|---|---|---|
| 9,902,071 | B2* | 2/2018 | Tan | G06T 7/70 |
| 2002/0101361 | A1* | 8/2002 | Barich | G06Q 10/06 340/907 |
| 2007/0061041 | A1* | 3/2007 | Zweig | G05D 1/0261 700/245 |
| 2010/0076631 | A1* | 3/2010 | Mian | G05D 1/0229 701/19 |
| 2012/0004774 | A1* | 1/2012 | Umetsu | B25J 5/007 700/254 |
| 2014/0067188 | A1* | 3/2014 | Mian | G05D 1/0229 701/28 |
| 2014/0163730 | A1* | 6/2014 | Mian | B25J 9/16 700/248 |
| 2014/0371911 | A1* | 12/2014 | Mian | B25J 9/1697 700/259 |
| 2015/0321350 | A1* | 11/2015 | Mian | B25J 9/16 700/257 |
| 2016/0059416 | A1 | 3/2016 | Tian et al. | |
| 2016/0089789 | A1* | 3/2016 | Sato | B25J 11/005 700/254 |
| 2017/0173795 | A1* | 6/2017 | Tan | B60T 15/54 |
| 2017/0341237 | A1* | 11/2017 | Jain | B25J 9/1697 |

FOREIGN PATENT DOCUMENTS

| | | |
|---|---|---|
| CN | 104122843 A | 10/2014 |
| CN | 204143630 U | 2/2015 |
| WO | 2013175803 A1 | 11/2013 |

OTHER PUBLICATIONS

Toris et al.; Robot Web Tools: Efficient messaging for cloud robotics; Intelligent Robots and Systems (IROS), 2015 ; pp. 4530-4537.

Aadhityan A; A novel method for implementing Artificial Intelligence, Cloud and Internet of Things in Robots; Innovations in Information, Embedded and Communication Systems (ICIIECS), 2015; pp. 1-4.

* cited by examiner

SYSTEM AND METHOD FOR CONTROLLING ROBOTIC MACHINE ASSEMBLIES TO PERFORM TASKS ON VEHICLES

FIELD

The subject matter described herein relates to systems that control robotic machine assemblies.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard.

In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. Use of human operators in a rail yard, however, is not without problems. The operations taking place in a rail yard pose safety risks to the human operators. Additionally, the use of human operators can involve increased cost relative to automated systems.

But, automated systems pose problems as well. Automated systems may be unreliable due to the wide variances in the brake systems among several different vehicles. For example, different vehicles may have brake levers in different locations that may be difficult for the automated system to locate, may have brake levers that require different amounts of force to actuate, may have other components that block movement of the automated system when attempting to access and pull the brake lever, may have brake levers that become temporarily stuck, etc. These variances can make it difficult for an automated system to perform brake bleeding operations.

BRIEF DESCRIPTION

In one embodiment, a robotic machine assembly includes a movable robotic arm configured to perform an assigned task that involves moving toward, engaging, and manipulating a target object of a vehicle. The assembly also includes a communication circuit configured to receive manipulation parameters for the target object from a remote database. The manipulation parameters are specific to at least one of the vehicle or a vehicle class in which the vehicle belongs. The assembly also includes one or more processors communicatively coupled to the communication circuit and the robotic arm. The one or more processors are configured to generate a task performance plan for the robotic arm based on the manipulation parameters. The task performance plan includes prescribed forces to be exerted by the robotic arm on the target object to manipulate the target object. The one or more processors also are configured to drive movement of the robotic arm during performance of the assigned task according to the task performance plan.

In one embodiment, a method includes receiving (at a robotic machine assembly from a remote database) manipulation parameters for a target object of a vehicle. The robotic machine assembly is configured to perform an assigned task that involves a robotic arm of the robotic machine assembly engaging and manipulating the target object. The manipulation parameters are specific to at least one of the vehicle or a vehicle class in which the vehicle belongs. The method also includes generating (using one or more processors) a task performance plan for the robotic machine assembly based on the manipulation parameters. The task performance plan includes prescribed forces to be exerted by the robotic arm on the target object to manipulate the target object. The method also includes driving movement of the robotic arm according to the task performance plan to perform the assigned task.

In one embodiment, a control system includes a robotic machine assembly including a movable robotic arm, a communication circuit, and one or more processors. The robotic arm is configured to perform an assigned task that involves moving toward, engaging, and manipulating a target object of a vehicle. The system also can include a memory device disposed remote from the robotic machine assembly and the vehicle. The memory device includes a database that stores manipulation parameters for the target object. The manipulation parameters are specific to at least one of the vehicle and/or a vehicle class in which the vehicle belongs. Prior to performing the assigned task, the communication circuit of the robotic machine assembly is configured to receive the manipulation parameters for the target object from the memory device. The one or more processors are configured to control movement of the robotic arm during the performance of the assigned task on the vehicle based on the manipulation parameters received from the memory device.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
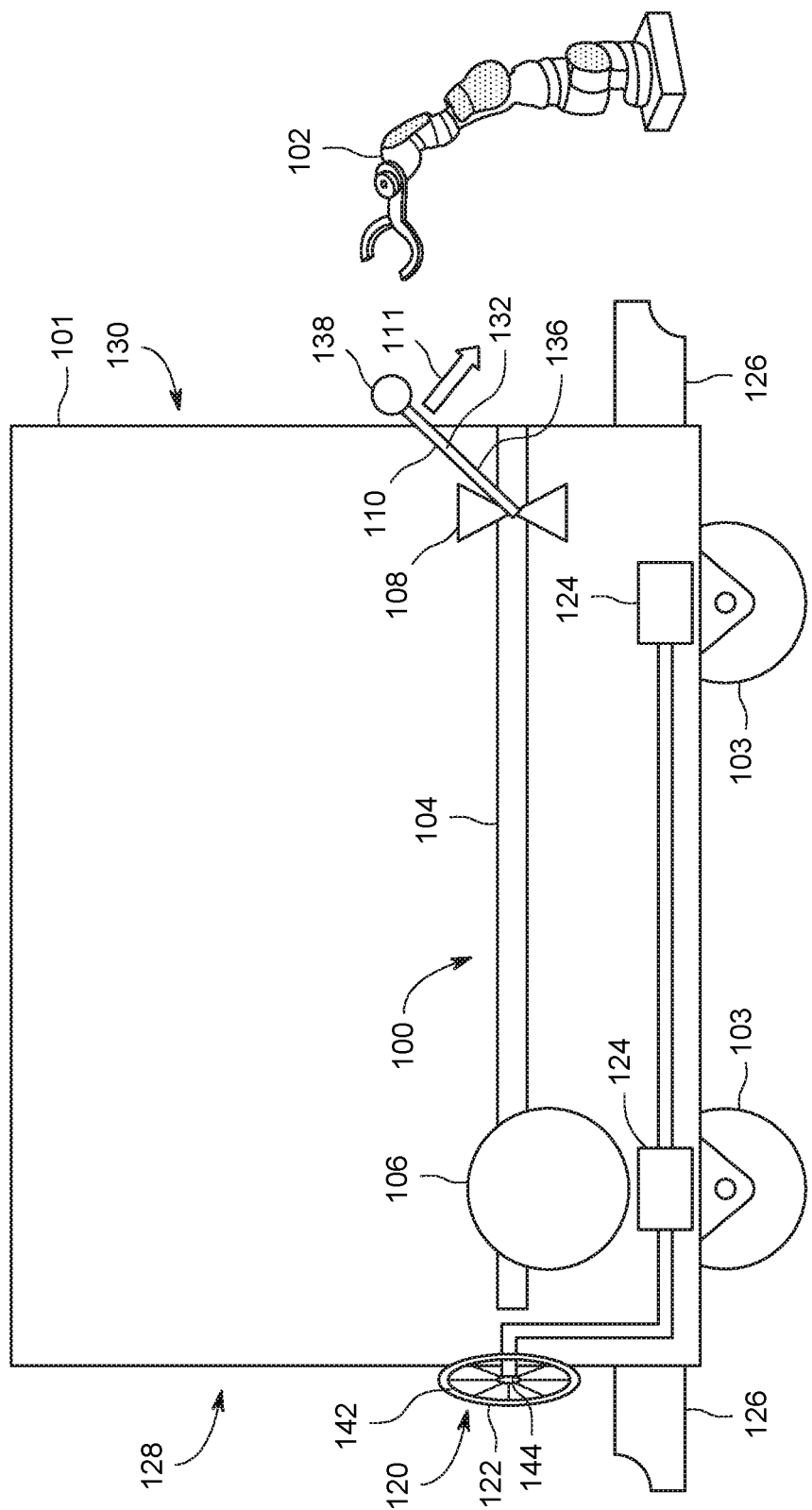
FIG. 1 schematically illustrates a vehicle and a robotic machine assembly according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles such as rail cars, trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles.

The systems and methods described herein can be used to perform an assigned task on a vehicle using an automated robotic machine assembly. The assigned task may involve the robotic machine assembly approaching, engaging, and manipulating (e.g., moving) a target object on the vehicle. In one embodiment, the assigned task may be to release air from an automated air brake system on a vehicle, such as a rail car. The task may be referred to as brake bleeding herein. The robotic machine assembly may perform the task by grasping a brake lever and pulling the brake lever with a certain force (e.g., torque) in a certain direction and for a certain distance, before releasing the brake lever or returning the brake lever to a starting position. The robotic machine assembly may be configured to perform the same or similar tasks on multiple vehicles in a vehicle system. The robotic machine assembly may also be used to perform the same or similar tasks on different types of vehicles and/or on different vehicle systems, such as on different trains. For example, the robotic machine assembly may perform brake bleeding tasks on the rail cars in a first train in a first railyard, and then the robotic machine assembly may be transported to a second railyard and assigned the task of bleeding the brakes on the rail cars of a second train.

In the brake bleeding task, uncertainty may be a concern for the robotic machine assembly performing tasks on different types of vehicles and/or different vehicle systems. For example, different types of rail cars in the same or different trains may have respective brake levers of different sizes, positions, locations, types, and even materials. Thus, there may not be a universal accurate description for all of the brake levers or other target objects that a given robotic machine assembly is assigned to manipulate. Furthermore, even vehicles of the same general class, type, or category may have brake levers that differ from one another due to differing wear, environmental conditions, aggregation of debris, and the like. Thus, the brake lever on a first vehicle may be successfully actuated to release air from the air brake system responsive to an exerted torque of 30 foot-pounds (lb·ft), while the brake lever on a second vehicle in the same vehicle class as the first vehicle may require more force, such as 32 lb·ft, to release the air from the air brake system. Thus, if the robotic machine assembly only exerts 30 lb·ft on the brake lever of the second vehicle, instead of at least 32 lb·ft, the brake lever would not be successfully actuated and the task would not be successfully completed. Since the target objects of even similar vehicles differ from one another, programming the robotic machine assembly to perform a given assigned task based on one, universal set of characteristics or parameters for the designated target object may not be feasible to assure that the assigned task is performed correctly or sufficiently on each of multiple different vehicles.

In one or more embodiments described herein, information about the target objects that a robotic machine assembly is assigned to manipulate and the vehicles on which the target objects are disposed is stored on one or more remote databases in the cloud. The robotic machine assembly assigned to perform a given task on a vehicle may inquire for information relevant to the target object and the vehicle prior to performing the task. Information stored in the one or more remote databases that is relevant to the target object and the vehicle may be retrieved from the one or more remote databases and communicated to the robotic machine assembly. The robotic machine assembly uses the received information when planning and executing the assigned task. The information received from the one or more remote databases allows the robotic machine assembly to customize the performance of an assigned task based on the specific vehicle, for example, on which the task is performed. Customizing the performance of the assigned task using the information received from the one or more remote databases may reduce the number of unsuccessful task performances of the robotic machine assembly compared to the robotic machine assembly performing the assigned tasks on multiple vehicles or vehicle systems without receiving information from the one or more remote databases. Since the information about the target objects and vehicles is communicated to the robotic machine assembly from a remote source, the robotic machine assembly may be allowed to reduce the amount of information that the robotic machine assembly stores locally on the robotic machine assembly relative to the robotic machine assembly storing custom information about the target objects on each of the vehicles that the robotic machine assembly performs the assigned task.

Furthermore, the robotic machine assembly may be configured to communicate feedback information about the performance of the assigned task to the one or more remote databases after the completion of the assigned task. The feedback information may be stored in the one or more remote databases. The feedback information may be used to update the information on file regarding the specific vehicle or vehicles on which the robotic machine assembly performed the assigned task. Thus, the information stored in the one or more remote databases and provided to the robotic machine assemblies prior to the latter performing assigned tasks may be continually updated, which increases the accuracy and precision of the information that is provided to the robotic machine assemblies relative to static information that is not updated.

FIG. 1 schematically illustrates a vehicle 101 and a robotic machine assembly 102 according to one embodiment. The vehicle 101 is a rail vehicle in the illustrated embodiment, such as a non-propulsion-generating rail car, but may be another kind of vehicle, such as an automobile, an off-road vehicle, or the like, in an alternative embodiment. The robotic machine assembly 102 is configured to perform an assigned task on the vehicle 101.

The vehicle 101 includes an air brake system 100 disposed onboard the vehicle 101. The air brake system 100 operates on a pressure differential within one or more conduits 104 of the air brake system 100. When the pressure of a fluid, such as air, in the conduits 104 is above a designated threshold or when the pressure increases by at least a designated amount, air brakes 106 of the brake system 100 engage corresponding wheels 103 of the vehicle 101. Although only one air brake 106 is shown in FIG. 1, the brake system 100 may include several air brakes 106.

The conduit 104 is connected with a valve 108 that closes to retain the fluid within the conduit 104. The valve 108 can be opened to release (e.g., bleed) the fluid out of the conduit 104 and the air brake system 100. Once the pressure of the fluid in the conduit 104 and air brake system 100 drops by or below a designated amount, the air brakes 106 of the brake system 100 release the wheels 103. The vehicle 101 may then freely roll with the air brakes 106 being disengaged.

The valve 108 can be actuated by manipulating (e.g., moving) a brake lever 110. The brake lever 110 can be pulled or pushed in a direction 111 to open and close the valve 108. In an embodiment, releasing the brake lever 110 may cause the valve 108 to close. For example, the brake lever 110 may move under the force of a spring or other biasing component to return to a starting position and force the valve 108 closed. In another embodiment, the brake lever 110 may require an operator or an automated system to return the brake lever 110 to the starting position to close the valve 108 after bleeding the air brake system 100.

The vehicle 101 also includes a hand brake system 120 disposed onboard the vehicle 101. The hand brake system 120 includes a brake wheel 122 that is configured to be rotated manually by an operator. The brake wheel 122 is mechanically linked to hand brakes 124 (e.g., shoes or pads) on the vehicle 101. Rotation of the brake wheel 112 in a first direction causes the hand brakes 124 to move toward and engage the wheels 103, setting the hand brakes 124. Rotation of the brake wheel 112 in an opposite, second direction causes the hand brakes 124 to move away from and disengage the wheels 103, releasing the hand brakes 124. In an alternative embodiment, the hand brake system 120 includes a lever or another actuatable device instead of the brake wheel 122.

The vehicle 101 may be part of a vehicle system (not shown) that includes a plurality of interconnected vehicles for traveling together along a route. The vehicle 101 includes a mechanical coupler 126 at both a front end 128 and a rear end 130 of the vehicle 101. The mechanical couplers 126 are configured to mechanically engage and connect to a complementary coupler on another vehicle to interconnect or couple the vehicle 101 with the other vehicle. The vehicle 101 may be uncoupled from the other vehicle by disconnecting the mechanical coupler 126 from the corresponding coupler of the other vehicle.

The robotic machine assembly 102 is configured to perform an assigned task on the vehicle 101. The assigned task involves the robotic machine assembly 102 engaging and manipulating a target object 132 on the vehicle 101. Since the vehicle 101 may be coupled to other vehicles in a vehicle system, the robotic machine assembly 102 may be configured to perform the assigned task on multiple vehicles in the vehicle system. For example, the robotic machine assembly 102 may be mobile and configured to move along the vehicle system from vehicle to vehicle. At each vehicle 101, the robotic machine assembly 102 recognizes and locates the applicable target object, moves toward the target object, engages the target object, and manipulates the target object to perform the assigned task.

In one embodiment, the assigned task may be for the robotic machine assembly 102 to bleed the air brake system 100 of the vehicle 101 and other vehicles in the vehicle system. For example, all or at least most of the vehicles in the vehicle system may include an air brake system similar to the air brake system 100. Prior to the vehicle system starting to move from a stationary position, the air brake systems of each of the vehicles need to be bled. The applicable target object in the task is the brake lever 110. At each vehicle 101, the robotic machine assembly 102 recognizes and locates the brake lever 110, moves toward the brake lever 110, engages the brake lever 110, and manipulates the brake lever 110 by pulling or pushing the brake lever 110 to bleed the air brakes 106. Once it is determined that the valve 108 has been opened to release the air brakes 106, the robotic machine assembly 102 disengages the brake lever 110 and moves to the next vehicle in the vehicle system to repeat the brake bleeding process. Optionally, the robotic machine assembly 102 may implement one or more follow up actions responsive to determining that the air brake system 100 has or has not been released, such as by communicating with one or more human operators, attempting to release the air brake system 100 again, or identifying the vehicle 101 having the air brake system 100 that is not released as requiring inspection, maintenance, or repair.

Bleeding the air brake system 100 is one potential task that may be performed by the robotic machine assembly 102 on the vehicle 101, but the robotic machine assembly 102 may be configured to perform additional or different tasks other than brake bleeding. For example, the robotic machine assembly 102 may be assigned the task of setting and/or releasing the hand brakes 124 of the vehicle 101. The robotic machine assembly 102 performs the task by manipulating the brake wheel 122, which represents the target object. The robotic machine assembly 102 may perform the task of setting or releasing the hand brakes 124 by locating and recognizing the brake wheel 122, moving toward the brake wheel 122, engaging the brake week 122, and then rotating the brake wheel 122 in a designated direction to set or release the hand brakes 124. After completing the assigned task on the vehicle 101, the robotic machine assembly 102 may move to another vehicle in the same vehicle system to perform the same or a similar task on the other vehicle.

In another example, the robotic machine assembly 102 may be assigned the task of connecting or disconnecting the vehicle 101 relative to another vehicle. The robotic machine assembly 102 performs the task by engaging and manipulating one of the mechanical couplers 126 of the vehicle 101, which represents the target object. Thus, the robotic machine assembly 102 may be used to assemble and/or segment a vehicle system having plural vehicles. Although three potential tasks for the robotic machine assembly 102 are described with reference to FIG. 1, the robotic machine assembly 102 may be configured to perform various other tasks on the vehicle 101 that involve manipulating a target object.

Figure 2:
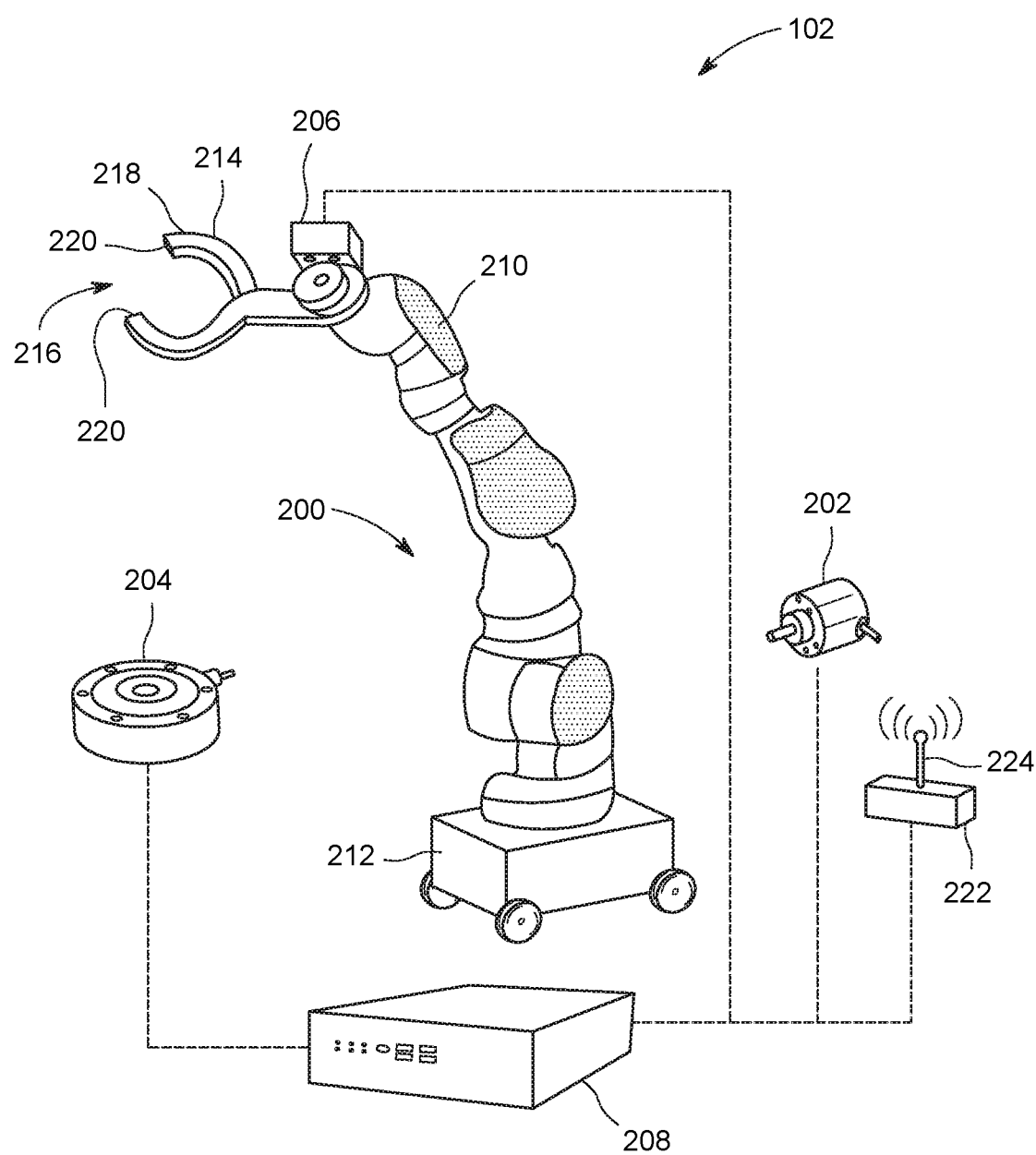
FIG. 2 illustrates one embodiment of the robotic machine assembly shown in FIG. 1.

FIG. 2 illustrates one embodiment of the robotic machine assembly 102 shown in FIG. 1. The machine assembly 102 includes a movable robotic arm 210 that moves under the direction of a controller 208. The robotic arm 210 may be mounted on a mobile base 212. The mobile base 212 moves the arm 210 toward the target object of an assigned task and also transports the arm 210 from vehicle to vehicle. The arm 210 is configured to move in multiple different directions and planes relative to the base 212 under the control of the controller 208. The controller 208 drives the arm 210 to move toward the corresponding target object (e.g., the brake lever 110 shown in FIG. 1) to engage the target object and manipulate the target object to perform the assigned task. For example, the controller 208 may convey commands in the form of electrical signals to actuators, motors, and/or other devices of the robotic arm 210 that provide a kinematic response to the received commands.

The controller 208 represents hardware circuitry that includes, represents, and/or is connected with one or more processors (e.g., microprocessors, field programmable gate arrays, integrated circuits, or other electronic logic-based devices). The controller 208 may include and/or be communicatively connected with one or more digital memories, such as computer hard drives, computer servers, removable hard drives, etc. The controller 208 is communicatively coupled with the robotic arm 210 and the mobile base 212 by one or more wired and/or wireless connections that allow the controller 208 to dictate how and where the robotic machine assembly 102 moves. Although shown as a separate device that is not attached to the robotic arm 210 or the mobile base 212, the controller 208 optionally may be mounted on the robotic arm 210 or the mobile base 212.

The robotic arm 210 may include an end effector 214 at a distal end 216 of the robotic arm 210 relative to the mobile base 212. The end effector 214 is configured to directly engage the target object to manipulate the target object. For example, the end effector 214 may grasp the brake lever 110

(shown in FIG. 1) to hold the lever 110 such that subsequent movement of the robotic arm 210 moves the brake lever 110 with the arm 210. In the illustrated embodiment, the end effector 214 has a claw 218 that is controllable to adjust the width of the claw 218 to engage and at least partially enclose the brake lever 110. The claw 218 includes at least two fingers 220 that are movable relative to each other. For example, at least one of the fingers 220 is movable relative to the other finger 220 to adjust the width of the claw 218 to allow the claw 218 to grasp the target object. The end effector 214 may have other shapes in other embodiments.

The robotic machine assembly 102 also includes a communication circuit 222. The communication circuit 222 is operably connected to the controller 208, and may represent hardware and/or software that is used to communicate with other devices and/or systems, such as remote servers, computers, satellites, and the like. The communication circuit 222 may include a transceiver and associated circuitry (e.g., an antenna 224) for wireless bi-directional communication of various types of messages, such as initiation messages, request messages, command messages, reply messages, feedback messages, or the like. The communication circuit 222 may be configured to transmit messages to specific designated remote receivers and/or to broadcast messages indiscriminately. In an embodiment, the communication circuit 222 is configured to receive and convey information from one or more remote sources to the controller 208 prior to and/or during the performance of an assigned task. As described in more detail herein, the information received by the communication circuit 222 from remote sources may include manipulation parameters corresponding to the target object that are used by the controller 208 to control the movement of the robotic arm 210 during the performance of the assigned task. Although the communication circuit 222 is illustrated as a box or device that is separate from the robotic arm 210 and the mobile base 212, the communication circuit 222 may be mounted on the robotic arm 210 or the mobile base 212.

The robotic machine assembly 102 includes one or more sensors 202, 204, 206 that monitor operational parameters of the robotic machine assembly 102 and/or the vehicle 101 (shown in FIG. 1) on which the robotic machine assembly 102 performs the assigned task. The operational parameters are communicated from the respective sensors 202, 204, 206 to the controller 208, which examines the parameters to make determinations regarding the control of the robotic arm 210, the mobile base 212, and the communication circuit 222. In the illustrated example, the robotic machine assembly 102 includes an encoder sensor 202 that converts rotary and/or linear positions of the robotic arm 210 into one or more electronic signals. The encoder sensor 202 can include one or more transducers that generate the electronic signals as the arm 210 moves. The electronic signals can represent displacement and/or movement of the arm 210, such as a position, velocity, and/or acceleration of the arm 210 at a given time. The position of the arm 210 may refer to a displaced position of the arm 210 relative to a reference or starting position of the arm 210, and the displacement may indicate how far the arm 210 has moved from the starting position. Although shown separated from the robotic arm 210 and mobile base 212 in FIG. 2, the encoder sensor 202 may be mounted on the robotic arm 210 or the mobile base 212 in an embodiment.

The robotic machine assembly 102 also includes an imaging sensor 206 that is installed on the robotic arm 210. In an embodiment, the imaging sensor 206 is mounted on or at least proximate to the end effector 214. For example, the imaging sensor 206 includes a field of view that encompasses at least a portion of the end effector 214. The imaging sensor 206 moves with the robotic arm 210 as the robotic arm 210 moves toward the brake lever 110. The imaging sensor 206 acquires perception information of a working environment of the robotic arm 210. The perception information includes images and/or video of the target object in the working environment. The perception information is conveyed to the controller 208 as electronic signals. The controller 208 may use the perception information to identify and locate the target object relative to the robotic arm 210 during the performance of the assigned task. Optionally, the perception information may be three-dimensional data used for mapping and/or modeling the working environment. For example, the imaging sensor 206 may include an infrared (IR) emitter that generates and emits a pattern of IR light into the environment, and a depth camera that analyzes the pattern of IR light to interpret perceived distortions in the pattern. The imaging sensor 206 may also include one or more color cameras that operate in the visual wavelengths. The imaging sensor 206 may acquire the perception information at an acquisition rate of at least 15 Hz, such as approximately 30 Hz. Optionally, the imaging sensor 206 may be a Kinect™ sensor manufactured by Microsoft.

The robotic machine assembly 102 further includes a force sensor 204 that monitors forces applied by the robotic arm 210 on the target object during the performance of the assigned task. As used herein, the term "force" encompasses torque, such that the forces applied by the robotic arm 210 on the target object described herein may or may not result in the target object twisting or rotating. The force sensor 204 may communicate electronic signals to the controller 208 that represent the forces exerted by the robotic arm 210 on the target object, as monitored by the force sensor 204. The forces may represent forces applied by the claw 218 of the end effector 214 on the target object. The forces may also represent forces applied on various joints of the robotic arm 210 for moving and maneuvering the arm 210.

Optionally, the robotic machine assembly 102 may include one or more other sensors in addition to, or instead of one or more of, the sensors 202, 204, 206 shown in FIG. 2. For example, the robotic machine assembly 102 may include an acoustic sensor that detects sounds generated during actuation of the brake lever 110 (shown in FIG. 1) to determine whether the brake lever 110 has been actuated to release the air brake system 100 (FIG. 1). The robotic machine assembly 102 may also include one or more sensors that monitor the speed of the mobile base 212 and/or the speed at which the robotic arm 210 moves relative to the base 212.

Figure 3:
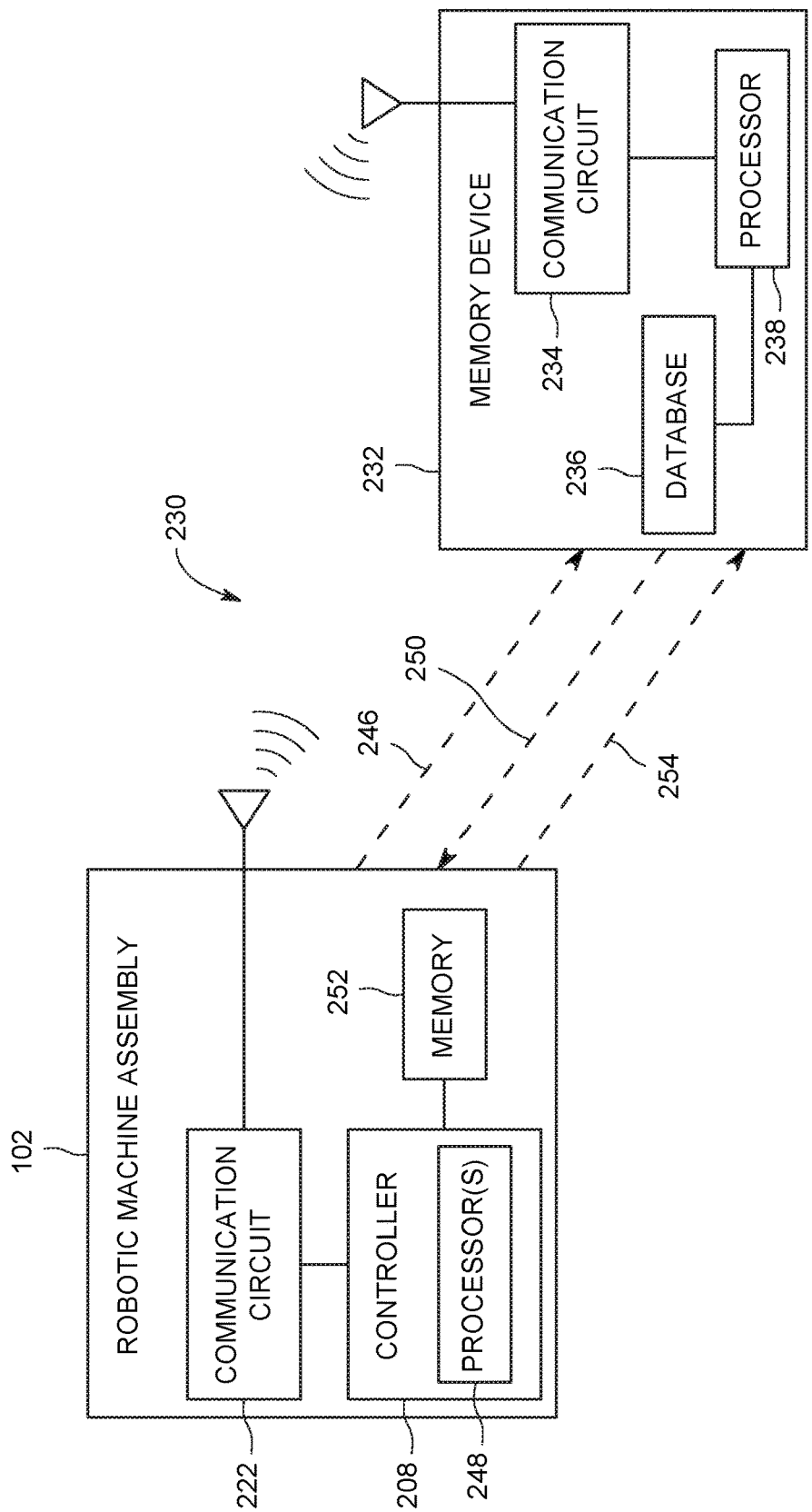
FIG. 3 is a schematic block diagram of a control system that includes the robotic machine assembly and a memory device according to an embodiment.

FIG. 3 is a schematic block diagram of a control system 230 that includes the robotic machine assembly 102 and a digital memory device 232 according to an embodiment. The control system 230 is configured to control movement of the robotic machine assembly 102 to perform an assigned task on at least one vehicle. The robotic machine assembly 102 in FIG. 3 represents the robotic machine assembly 102 as shown in FIG. 2, although FIG. 3 illustrates only a few of the components of the robotic machine assembly 102, including the controller 208 and the communication circuit 222. As described above, the robotic machine assembly 102 is configured to manipulate a target object on a vehicle to perform an assigned task. The memory device 232 is located remote from the robotic machine assembly 102. The memory device 232 communicates with the robotic machine assembly 102 to provide information about the target object to the robotic machine assembly 102. The robotic machine assembly 102 may use the information received from the memory device 232 when planning and executing the performance of the assigned task.

The memory device 232 in the illustrated embodiment includes a communication circuit 234, a database 236, and a processor 238 operably coupled to the database 236 and the communication circuit 234. The memory device 232 may be or include a computer, a server, an electronic storage device, or the like. The memory device 232, or the database 236 thereof, may be a tangible and non-transitory (e.g., not a transient signal) computer readable storage medium. The database 236 stores information related to various tasks for the robotic machine assembly 102, such as the brake bleeding task. The processor 238 is configured to access the database 236 to retrieve information specific to an assigned task. Although shown as a single, unitary hardware device, the memory device 232 may include multiple difference hardware devices communicatively connected to one another. For example, in an embodiment, the memory device 232 may be one or more servers configured to provide "cloud" data storage. The memory device 232 may be located in a data center, at a railroad dispatch location, at a control center, or the like.

The information stored in the database 236 includes manipulation parameters for the target object that is relevant to the task. The manipulation parameters include location-based parameters, such as parameters used for locating, recognizing, and engaging the target object. The manipulation parameters also include force-based parameters, such as parameters used for determining the proper amount of force to exert on the target object and the proper direction and distance that the target object is moved to result in a successful performance of the assigned task without damaging the target object, the vehicle on which the target object is located, or the robotic machine assembly 102. The manipulation parameters for the target object may include one or more of a location of the target object relative to the vehicle, a shape of the target object, a size of the target object, a material of the target object, an identification of a contact portion of the target object, a position of the target object, an orientation of the target object, an actuation direction for manipulating the target object, an actuation distance for manipulating the target object, an actuation speed for manipulating the target object, and an actuation force for manipulating the target object.

With additional reference to FIG. 1, for the brake bleeding task, the manipulation parameters are related to the brake lever 110, which is the target object. The location parameter for the brake lever 110 stored in the database 236 may specify that the brake lever 110 is located at the rear end 130 of the vehicle 101. The shape parameter may describe the brake lever 110 as having a cylindrical shaft 136 with a spherical knob 138 at a distal end thereof. The size parameter provides dimensions for the brake lever 110, such as a length and a diameter of the shaft 136. The material parameter may specify that the brake lever 110 is composed of a certain kind of metal, such as steel or aluminum. The material parameter may also specify certain characteristics of the material, such as the strength of the material. The identification of the contact portion of the brake lever 110 may specify a recommended portion of the brake lever 110 for the robotic arm 210 to engage, such as the knob 138 or a portion of the shaft 132 proximate to the knob 138. The position parameter may describe whether the brake lever 110 is currently in a retracted position that is proximate to the vehicle 101, an extended position that extends away from the vehicle 101, or a position between the retracted and extended positions. For example, the brake lever 110 may be in the retracted position in the illustration in FIG. 1. The orientation parameter describes the three-dimensional orientation of the brake lever 110 relative to the vehicle 101. For example, the orientation parameter describes the angle of the brake lever 110 along vertical, lateral, and longitudinal axes relative to the vehicle 101. The parameters described above may be used by the robotic machine assembly 102 as the robotic arm 210 approaches the brake lever 110 to orient the robotic arm 210 relative to the brake lever 110 and properly engage the brake lever 110.

The actuation force parameter for the brake lever 110 refers to a recommended or required force to be exerted by the robotic arm 210 on the brake lever 110 to move the brake lever 110 in order to actuate the valve 108. For example, the actuation force parameter may specify that the robotic arm 210 should exert 32 lb·ft on the brake lever 110 to manipulate the brake lever 110. The actuation direction parameter refers to the direction that the robotic arm 210 should force the brake lever 110 to manipulate the brake lever 110. For example, the actuation direction parameter may provide position vectors that represent the direction 111 shown in FIG. 1. Although shown as linear in FIG. 1, the direction 111 that the brake lever 110 is pulled may be curved since the lever 110 pivots about a fulcrum. The actuation distance parameter describes a recommended distance that the brake lever 110 should be moved in order to assure that the valve 108 is sufficiently open to bleed the brakes, while avoiding damage to the air brake system 100. For example, the actuation distance may specify that the robotic arm 210 should pull the brake lever 110 a distance of 50 cm in the pulling direction 111. The actuation speed parameter provides a recommended speed at which the robotic arm 210 should move the brake lever 110 to avoid damage. The manipulation parameters may also specify whether, after being pulled from a starting position to a final position, the brake lever 110 is configured to return automatically to the starting position or the robotic arm 210 is required to manually move the brake lever 110 to the starting position.

In an embodiment, the manipulation parameters may include safety-related limits or constraints for the manipulation of the target object. For example, one parameter may specify an upper threshold limit for the actuation distance that the robotic machine assembly 102 moves the brake lever 110 (or other target object). Movement of the brake lever 110 farther than the upper threshold limit for the actuation distance may risk damage to the brake lever 110, valve 108, vehicle 101, and/or robotic machine assembly 102. The upper threshold limit for the actuation distance may be provided in addition to the actuation distance parameter. For example, the actuation distance parameter may recommend moving the brake lever 110 for 50 cm, and the upper threshold limit for the actuation distance may be 52 cm. The manipulation parameters may also include an upper threshold limit for the actuation force exerted by the robotic arm 210 on the brake lever 110, and/or an upper threshold limit for the actuation speed at which the robotic arm 210 moves the brake lever 110.

The database 236 may also store manipulation parameters for other target objects associated with tasks other than the brake bleeding task. For example, in a task to set or release the hand brakes 124 of the hand brake system 120, the manipulation parameters are related to the brake wheel 122. The manipulation parameters may describe the location of the wheel 122 as being along the front end 128 of the vehicle 101, the shape of the wheel 122 as circular, the size of the wheel 122 as having a certain specific diameter, and the like.

The manipulation parameters may identify a recommended contact portion of the wheel 122, such as an outer ring 142 of the wheel 122 or a location more proximate to a center hub 144 of the wheel 122. The manipulation parameters may also provide an actuation direction that the robotic arm 210 should force the brake wheel 122 to rotate the brake wheel 122 in a specified direction, either clockwise or counter-clockwise. The actuation distance may specify a recommended number of revolutions of the brake wheel 122 to complete the task, and the actuation force may specify a recommended or expected amount of force that the robotic arm 210 should exert on the brake wheel 122 to rotate the brake wheel 122 the recommended number of revolutions.

The database 236 may store manipulation parameters for the mechanical couplers 126 associated with the task to connect and/or disconnect the vehicle 101 relative to another vehicle. The manipulation parameters may identify the location of the coupler 126 to be manipulated relative to the vehicle 101, and may specify the size and shape and orientation of the coupler 126. The manipulation parameters may include an actuation force parameter, an actuation direction parameter, an actuation speed parameter, and/or an actuation distance parameter for the coupler 126 to perform the assigned task. For example, the manipulation parameters for the task of connecting the vehicle 101 to another vehicle may be different than the manipulation parameters for the task of disconnecting the vehicle 101 from another vehicle, since the robotic arm 210 needs to manipulate the coupler 126 differently depending on the task.

As described above, the manipulation parameters are specific to the target objects for various tasks. In an embodiment, the manipulation parameters may be categorized in the database 236 based on the vehicle 101 on which the specific target object is located. For example, the database 236 may include a file or folder for the specific vehicle 101, identified by a unique identification number, name, or the like, of the vehicle 101. The folder for the vehicle 101 may list and/or include subfolders for the various target objects on the vehicle 101 that are associated with potential tasks for the robotic machine assembly 102, such as the brake lever 110, the brake wheel 122, and the couplers 126. The subfolders include the manipulation parameters associated with the respective target object. The manipulation parameters for the specific vehicle 101 may be based on information received from a manufacturer of the vehicle 101, such as product specifications. The manipulation parameters may also be based on historical records provided from other robotic assemblies after performing previous tasks on the vehicle 101, such as observations and measured parameters. For example, the actuation force parameter for the brake lever 110 may be based on measured forces exerted on the brake lever 110 by other robotic machine assemblies during previous tasks.

The database 236 additionally, or alternatively, may include a file or folder for a vehicle class in which the vehicle 101 belongs. The vehicle class refers to a type, category, style, or group of vehicles, instead of referring to a specific, individual vehicle. For example, the vehicle class may identify the manufacturer of the vehicle 101, the make of the vehicle 101, the model of the vehicle 101, and/or the year that the vehicle 101 was manufactured. The database 236 may store manipulation parameters in the vehicle class folder that are specific to all vehicles in the vehicle class. For example, the vehicle class folder for the vehicle class that includes the vehicle 101 may include manipulation parameters for a brake lever that is the same type of brake lever as the brake lever 110, but are not specific to the individual brake lever 110. The manipulation parameters in the vehicle class folder may be based on manufacturer-provided product specifications and/or historical records provided from other robotic assemblies after performing previous tasks on the vehicle 101, such as observations and measured parameters. For example, the actuation force parameter for the brake lever 110 may be based on measured forces exerted on brake levers similar to the brake lever 110 on other vehicles in the same vehicle class as the vehicle 101 during previously-performed tasks.

Due to variables such as wear, debris accumulation, assembly, and the like, the manipulation parameters for the specific brake lever 110 of the vehicle 101 may differ at least slightly from the manipulation parameters for the brake levers in the vehicle class that includes the vehicle 101. For example, an actuation force parameter for the brake lever in the vehicle class may be 32 lb·ft, while an actuation force parameter for the specific brake lever 110 of the vehicle 101 may be 33 lb·ft. Since the database 236 stores manipulation parameters for groups or classes of vehicles, the memory device 232 may be able to provide manipulation parameters to the robotic machine assembly 102 about a vehicle on which the robotic machine assembly 102 is assigned to perform a task even if the database does not include information specific to the actual vehicle.

Referring now only to FIG. 3, the robotic machine assembly 102 is configured to communicate with the memory device 232 that is located remote from the robotic machine assembly 102. For example, the robotic machine assembly 102 may be transported from a first railyard to a different, second railyard to perform tasks on different vehicles than the robotic machine assembly 102 worked on at the first railyard. Instead of reprogramming the robotic machine assembly 102, which may be time intensive and costly, the robotic machine assembly 102 may communicate with the remote memory device 232 to receive manipulation parameters related to the vehicles in the second railyard.

In an embodiment, once the robotic machine assembly 102 is assigned to perform a given task on one or more specific vehicles, the robotic machine assembly 102 is configured to generate a parameter request message 246 that is communicated to the memory device 232. The parameter request message 246 identifies the robotic machine assembly 102 and requests the memory device 232 to send manipulation parameters to the robotic machine assembly 102 that are specific to the assigned task. The parameter request message 246 may be generated by one or more processors 248 in the controller 208, and may be transmitted by the communication circuit 222. For example, the parameter request message 246 may be transmitted wirelessly to the memory device 232 according to a wireless communication protocol. In an embodiment, the parameter request message 246 includes various identification information, such as an identification of the robotic machine assembly 102 sending the message 246, an identification of the one or more vehicles on which the robotic machine assembly 102 has been assigned to perform the task, an identification of the task, and/or an identification of the target object that is to be manipulated to perform the task.

The memory device 232 receives the parameter request message 246 via the communication circuit 234, which conveys the contents of the message 246 to the processor 238 for analysis. The communication circuit 234 of the memory device 232 may represent hardware and/or software that is used to communicate with other devices and/or systems, such as remote servers, computers, satellites, and the like. The communication circuit 234 may include a transceiver and associated circuitry for wireless bi-directional communication of messages. The processor 238 of the memory device 232 represents hardware circuitry that includes, represents, and/or is connected with one or more microprocessors, field programmable gate arrays, integrated circuits, or other electronic logic-based devices. Upon receiving the parameter request message 246, the processor 238 may access the database 236 to retrieve relevant manipulation parameters for the target object on the vehicle, as specified in the message 246. The processor 238 selects the relevant manipulation parameters from a collection of manipulation parameters that includes the relevant manipulation parameters and irrelevant manipulation parameters. The processor 238 may identify the relevant manipulation parameters based on the specific vehicle, task, and/or target object listed in the parameter request message 246. For example, the processor 238 may access a first folder for the specific vehicle, and then may access a subfolder in the first folder for the specific target object and/or task to retrieve the relevant manipulation parameters.

After retrieving the manipulation parameters requested in the parameter request message 246, the memory device 232 is configured to communicate a task parameter message 250 to the robotic machine assembly 102. The task parameter message 250 includes the manipulation parameters that are relevant to the specific task that the robotic machine assembly 102 is assigned to perform. The manipulation parameters in the message 250 are specific to the vehicle on which the task is to be performed or the vehicle class in which the vehicle belongs. The task parameter message 250 may be generated by the processor 238 and transmitted wirelessly by the communication circuit 234 of the memory device 232.

The communication circuit 222 of the robotic machine assembly 102 receives the task parameter message 250 and conveys the contents of the message 250 to the one or more processors 248 for analysis. Optionally, the contents of the task parameter message 250, including the manipulation parameters, may be stored, at least temporarily, in a local memory 252 of the robotic machine assembly 102. The memory 252 is a tangible and non-transitory (e.g., not a transient signal) computer readable storage medium, such as a hard drive. Although shown separate from, and communicatively coupled to, the controller 208, the memory 252 optionally may be contained within the controller 208. The one or more processors 248 of the robotic machine assembly 102 analyze the manipulation parameters received in the task parameter message 250 for controlling the movement of the robotic arm 210 during the performance of the assigned task. For example, in an embodiment, the one or more processors 248 are configured to generate a task performance plan for the robotic arm 210 based on the manipulation parameters. The task performance plan includes prescribed forces to be exerted by the robotic arm 210 on the target object to manipulate the target object. The prescribed forces in the task performance plan are based on the force-related manipulation parameters, such as the actuation direction parameter, the actuation force parameter, the actuation speed parameter, the actuation distance parameter, and/or any specified upper threshold limits for such parameters. The task performance plan generated by the one or more processors 248 may also include a prescribed approach orientation of the robotic arm 210 relative to the vehicle and the target object thereof, as the robotic arm moves toward the target object during an approach stage prior to manipulating the target object. The prescribed approach orientation may be based on the location-based manipulation parameters, such as the shape, size, position, and orientation of the target object. The task performance plan may also include a motion trajectory for the robotic arm 210 that provides a path for the robotic arm 210 to the target object during the approach stage prior to manipulating the target object. The one or more processors 248 may be further configured to drive movement of the robotic arm 210 during performance of the assigned task according to the task performance plan.

In an embodiment, as the robotic machine assembly 102 performs the assigned task on the vehicle, the various sensors (e.g., the encoder sensor 202, the force sensor 204, and the imaging sensor 206 shown in FIG. 2) on the robotic machine assembly 102 may monitor position, movement, and force data parameters of the robotic arm 210 as the robotic arm 210 manipulates the target object. For example, the force sensor 204 is configured to monitor the forces exerted by the robotic arm 210 on the target object as the robotic arm 210 engages and manipulates the target object. Although only one force sensor 204 is described, the robotic arm 210 may include multiple force sensors 204, such as one sensor that monitors a grasping force by the claw 218 (shown in FIG. 2) and another sensor that monitors the force exerted on the target object in the actuation direction to move the target object.

Optionally, after completion of the task on the vehicle, the robotic machine assembly 102 may communicate a feedback message 254 to the memory device 232. The feedback message 254 is generated by the one or more processors 248 and transmitted by the communication circuit 222. The feedback message 254 includes data parameters monitored by the sensors of the robotic machine assembly 102 during the performance of the assigned task. For example, the feedback message 254 includes data parameters representative of the forces exerted by the robotic arm 210 on the target object. The feedback message 254 also identifies the robotic machine assembly 102, the task, the vehicle on which the task was performed, and/or the target object that was manipulated. The information in the feedback message 254 may be used by the memory device 232 to update the database 236. For example, although the database 236 may contain an actuation force parameter of 32 lb·ft for manipulating a given target object on a specific vehicle, wear, rust, and other variables may change the parameters over time. The robotic machine assembly 102 may measure that 33 lb·ft of force is actually required to move the target object. The feedback message 254 includes the measured force parameter. In response to receiving the feedback message 254, the memory device 232 may update the actuation force parameter for the target object of the specific vehicle in the database 236 to be 33 lb·ft of force instead of 32 lb·ft. Therefore, the database 236 may be continually updated to store relevant, accurate manipulation parameters.

Although only one robotic machine assembly 102 is shown in FIG. 3, the memory device 232 may be configured to communicate with multiple robotic machine assemblies. The memory device 232 may send task parameter messages like the task parameter message 250 to other robotic machine assemblies. The task parameter messages include manipulation parameters stored in the database 236 that are specific to the tasks assigned to the corresponding robotic machine assemblies. For example, the task parameter message 250 shown in FIG. 3 may include manipulation parameters specific to the brake bleeding task for the vehicle 101 (shown in FIG. 1), while another task parameter message to a different robotic machine assembly may include manipulation parameters for another task on the same vehicle 101, on another vehicle in the same vehicle class as the vehicle 101, or on another vehicle in a different vehicle class.

Figure 4:
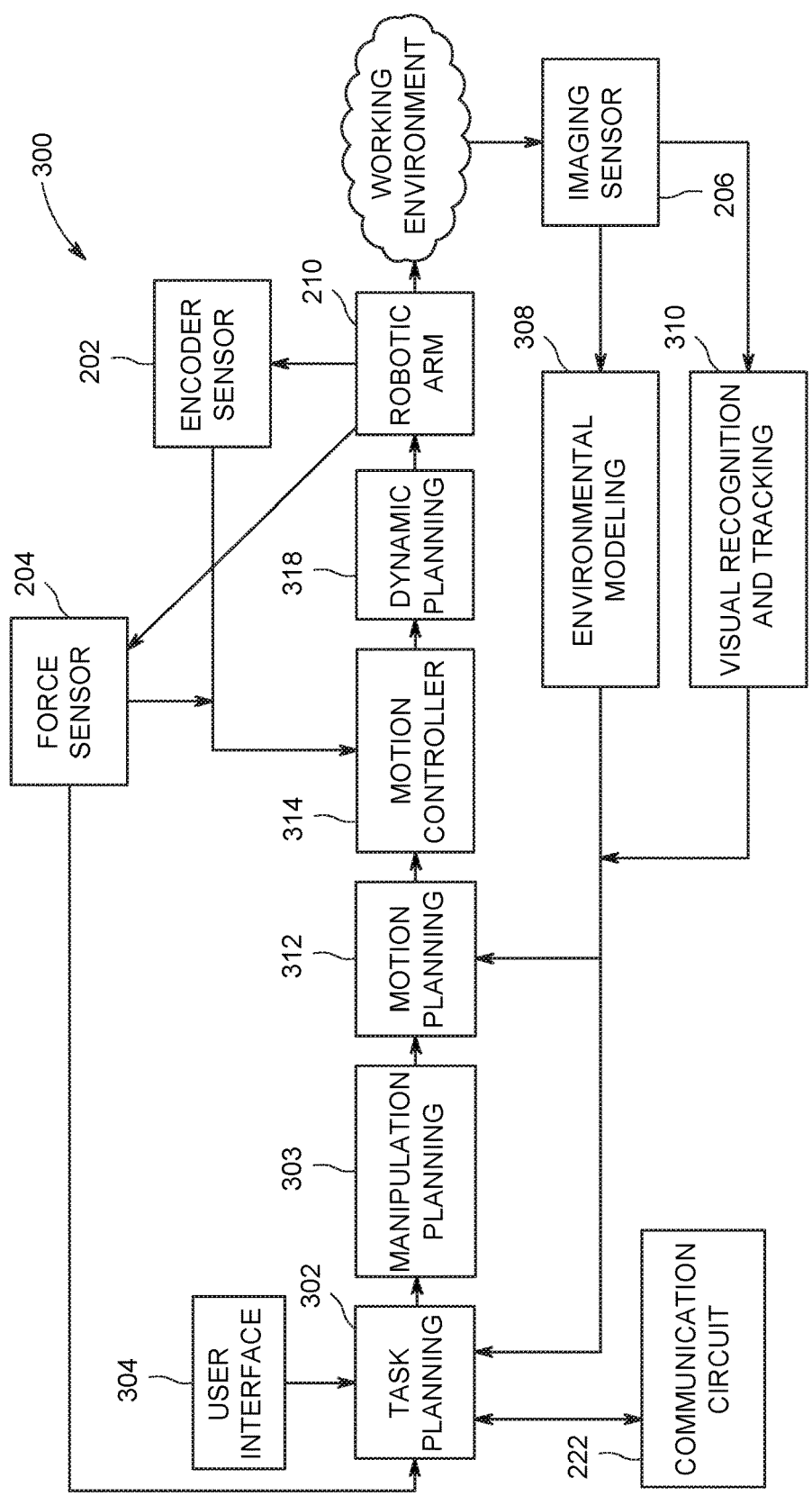
FIG. 4 is a block diagram of the robotic machine assembly according to one embodiment.

FIG. 4 is a block diagram 300 of the robotic machine assembly 102 (shown in FIG. 1) according to one embodiment. The block diagram 300 illustrates how the components of the robotic machine assembly 102 may interact to plan and then execute the movement of the robotic arm 210 to manipulate a target object on a vehicle to perform an assigned task. A task planning processor 302 receives an assigned task for the robotic machine assembly 102 to perform, such as to bleed the brakes of a vehicle. The task may be received from either a user interface 304 or the communication circuit 222. For example, the task may be input by an operator using the user interface 304 (for example, a graphical user interface) which may include a touchpad, a touchscreen, keys, buttons, knobs, or the like. The task alternatively may be received in a message format from a remote operator or system via the communication circuit 222. In addition to sending tasks to the task planning processor 302, the user interface 304 may be used to provide alerts, updates, warnings, instructions, and the like, an operator or another system. For example, the user interface 304 may include visible lights, audio speakers, vibrating devices, or the like.

The task planning processor 302, a manipulation processor 303, and a motion planning processor 312 may plan the performance of the assigned task. For example, the task, manipulation, and motion processors 302, 303, 312 may generate the task performance plan. The processors 302, 303, 312 may represent the one or more processors 248 of the controller 208 shown in FIG. 3. The task performance plan includes a motion trajectory that plans the movement of the robotic arm 210 from a starting position to the target object on the vehicle. The task performance plan also includes a prescribed approach orientation that plans the orientation of the robotic arm 210, including the claw 218 of the end effector 214 (shown in FIG. 2), as the robotic arm 210 approaches and engages the target object. The task performance plan further includes planned forces to be exerted by the robotic arm 210 on the target object to manipulate the target object, such as a planned pulling force and direction of the force on a brake lever. In an embodiment, the one or more processors 302, 303, 312 generate the task performance plan based on the manipulation parameters for the target object received from the memory device 232. Therefore, the robotic machine assembly 102 sends the parameter request message 246 to the memory device 232 and receives the responsive task parameter message 250 prior to generating the task performance plan.

The task planning processor 302 may schedule task primitives, which are high level steps or goals that describe the performance of the task. The task primitives may be a sequence of sub-tasks, such as, for example, move robotic machine assembly 102 to vehicle, extend robotic arm 210 to brake lever 110 (FIG. 1), grasp brake lever 110, pull brake lever 110, verify air brakes 106 (FIG. 1) are released, release brake lever 110, and retract arm 210. In an embodiment, the task planning processor 302 may use the manipulation parameters received from the memory device 232 to determine a grasping strategy, a prescribed actuation distance (e.g., how far the robotic arm 210 moves the target object), and any safety concerns. The grasping strategy may determine what portion of the target object to engage, what direction the arm 210 should force the target object, and the like. The safety concerns may be based, at least in part, on upper threshold limits for various parameters received from the memory device 232. For example, the task planning processor 302 may treat an upper threshold limit for an actuation distance that is received from the memory device 232 as a hard constraint that cannot be exceeded during the performance of the task.

The manipulation planning processor 303 may use the manipulation parameters received from the memory device 232 to determine, for example, a grasping pose of the robotic arm 210 and an actuation force that the arm 210 should exert on the target object. The grasping pose may include the prescribed approach orientation of the robotic arm 210, such as the angle or orientation the claw 218 of the end effector 214 relative to the target object and/or the vehicle as the arm 210 approaches the target object, and the controlled width of the claw 218. The grasping pose is determined based on the shape, size, position, and the like of the target object as specified in the manipulation parameters. For the task of brake bleeding, the actuation force may be a pulling force.

An environmental modeling processor 308 describes the working space or environment of the robotic arm 210. The environmental modeling processor 308 receives sensory perception information from the imaging sensor 206. The environmental modeling processor 308 may analyze the three-dimensional perception information to construct a point cloud-based map of the working environment, which provides relatively high precision. The environmental modeling processor 308 may use the constructed map to identify a location of the target object (e.g., the brake lever 110), as well as locations of any obstacles between the arm 210 and the target object. For example, a first set of points in the point cloud-based map may be associated with the target object, a second set of points may be associated with an obstacle, and a third set of points may be associated with free space. The output of the environmental modeling processor 308, such as the location of the target object, may be communicated to the task planning processor 302 and/or to a motion planning processor 312. For example, the perception information may be provided as closed-loop feedback to the task planning processor 302 after the arm 210 has started moving toward the target object, and the perception information is used to validate that the task is complete (for example, the brakes have been released).

A visual recognition and tracking processor 310 may work in conjunction with the environmental modeling processor 308 to locate the target object in the working environment. The visual recognition and tracking processor 310 receives the sensory perception information from the imaging sensor 206. In some known control systems, perception information is acquired at relatively high frequencies, but the processing of the visual information is slow, which slows the entire control system. In an embodiment, the visual recognition and tracking processor 310 uses a cascade processing sequence to increase the processing speed when the arm 210 is moving. In a first stage of the cascade processing sequence, the visual recognition and tracking processor 310 performs two-dimensional image processing on the acquired perception information to identify at least one target area in the image that potentially includes the brake lever 110. This first stage may be performed prior to and/or during movement of the arm 210 toward the target object. In a subsequent second stage of the cascade processing sequence, the visual recognition and tracking processor 310 performs three-dimensional image segmentation on the at least one target area. The three-dimensional image segmentation uses the point cloud-based data provided by the environmental modeling processor 308 to segment the target area to more precisely locate the target object. The three-dimensional segmentation may also provide more precise detail about the target object, such as the size, shape, and orientation of the target object. This second stage may be performed prior to and/or during movement of the arm 210.

By performing the three-dimensional segmentation on the identified one or more target areas, and not on other areas outside of the target area(s), the overall detection rate (including both image acquisition and image processing) is increased relative to known control systems that do not use the two-stage cascade processing sequence. The detection rate is used to track the location of the target object as the arm 210 moves to provide closed loop feedback that reduces the error between the arm 210 and the target object. The visual recognition and tracking processor 310 communicates the location of the target object to the motion planning processor 312 as an output.

The motion planning processor 312 is configured to determine a relatively smooth and collision-free motion trajectory in the working environment for the robotic arm 210 to extend towards and actuate the target object. The motion planning processor 312 receives the position of the target object and the positions of any obstacles from the environmental modeling processor 308 and/or the visual recognition and tracking processor 310. For example, the position of the target object may be received from the visual recognition and tracking processor 310, and the positions of any obstacles is received from the environmental modeling processor 308. The motion planning processor 312 analyzes the received information to generate the motion trajectory as a sequence of via-points that define a path for the arm 210 towards the target object. Each via-point may be computed with temporal information and motion information (including position, velocity, and acceleration) of the arm 210 at each via-point. The motion trajectory may be computed by combining attraction to the position of the target object in the three-dimensional field and repulsion from the positions of the obstacles.

In order to reduce the error between the arm 210 and the target object as the arm 210 moves along the motion trajectory, the motion planning processor 312 is configured to revise the motion trajectory based on updated positions of the target object and the obstacles received from the environmental modeling processor 308 and/or the visual recognition and tracking processor 310 during movement of the arm 210. Optionally, the motion planning processor 312 may generate a revised motion trajectory periodically, such as once every half second, once every second, or once every two seconds. Planning in the motion trajectory may be limited to the succeeding ten or so via-points to avoid unnecessary computing for each revised motion trajectory. By revising the motion trajectory during movement of the arm 210 toward the target object, the robotic machine assembly 102 (shown in FIG. 1) provides closed-loop feedback and control to increase the precision of the arm 210 relative to the target object.

A motion controller 314 receives the motion trajectory from the motion planning processor 312. The motion controller 314 analyzes the motion trajectory and generates driving signals for the robotic arm 210 based on the motion trajectory. The driving signals control the arm 210 to follow the path defined by the motion trajectory. For example, the driving signals are configured to control movement of the arm 210 such that the arm 210, or a component thereof, passes through the designated via-points at the designated times with little error between the actual positions of the arm 210 and the desired positions (at the via-points). The motion controller 314 optionally may use a control loop feedback mechanism, such as a proportional-integral-derivative (PID) controller, to reduce the error between the actual measured positions of the arm 210 and the desired positions at corresponding designated via-points. For example, the motion controller 314 may adjust the process through the use of a manipulated variable to reduce the error. The motion controller 214 also generates driving signals that control the movement of the robotic arm 210 when the robotic arm 210 is engaged with the target object. For example, the driving signals may describe the distance that the robotic arm 210 moves the target object, the direction that the robotic arm 210 moves the target object, the force exerted by the robotic arm 210 on the target object, and/or the speed at which the robotic arm 210 moves the target object.

A dynamic planning processor 318 receives the driving signals from the motion controller 314. The dynamic planning processor 318 analyzes the driving signals to generate forces (e.g., torques) on various joints of the robotic arm 210 to drive the motion of the arm 210 according to the task performance plan. The dynamic planning processor 318 may generate the forces using a robotic dynamics model. In addition to, or instead of, using the position and velocity driving signals, the dynamic planning processor 318 may analyze the desired via-points in the motion trajectory to generate the forces. In an embodiment, the dynamic planning processor 318 provides hybrid motion and force planning that plans the motion of the arm 210 and forces applied by the arm 210 on the target object simultaneously (or concurrently). For example, one force generated by the dynamic planning processor 318 may be conveyed to a joint between two linear segments of the arm 210 to control the relative angle between the two linear segments, and a second force may be conveyed concurrently to the end effector 214 (shown in FIG. 2) to control the width of the claw 218 (FIG. 2).

The dynamic planning processor 318 is configured to receive feedback from one or more sensors during movement of the arm 210, and adjusts the generated forces based on the feedback to reduce discrepancies between the monitored movement and the planned movement of the robotic arm 210 according to the task performance plan. For example, the dynamic planning processor 318 analyzes the feedback to determine whether the robotic arm 210, in the performance of the task, exerts a pulling force on the target object that is (at least approximately) equal to the actuation force parameter received from the memory device 232 and included in the task performance plan. The dynamic planning processor 318 also may determine whether the robotic arm 210 moves the target object a distance that is equal to the actuation distance parameter received from the memory device 232 and included in the task performance plan.

Optionally, if the dynamic planning processor 318 receives feedback that indicates that one of the upper threshold limits, such as the upper threshold limit for an actuation force exerted on the target object, has been exceeded, the dynamic planning processor 318 may take responsive action. For example, the dynamic planning processor 318 may generate an alert to notify an operator using the user interface 304. The dynamic planning processor 318 may generate an alert message that is communicated remotely via the communication circuit 222 to a control center, a dispatch location, or the like. The alert may identify the upper threshold limit parameter that is exceeded, and may suggest maintenance.

Although the block diagram 300 illustrates the task planning processor 302, the manipulation planning processor 303, the motion planning processor 312, the environmental modeling processor 308, the visual recognition and tracking processor 310, and the dynamic planning processor 318 as separate components, at least some of the processors 302, 303, 312, 308, 310, and 318 may be combined in a single device, such as the controller 208 (shown in FIGS. 2 and 3). For example, at least some of the processors 302, 303, 312, 308, 310, and 318 may be embodied in a single physical processor within the controller 208, or may be embodied in two or more physical processors within the controller 208. Alternatively, at least some of the processors 302, 303, 312, 308, 310, and 318 may be contained in separate devices, such that one or more of the processors 302, 303, 312, 308, 310, and 318 are contained in one controller (for example, the controller 208), and at least one other of the processors 302, 303, 312, 308, 310, and 318 is contained in a different controller. In an alternative embodiment, the robotic machine assembly 102 does not include all of the processors 302, 303, 312, 308, 310, and 318 shown in FIG. 4.

Figure 5:
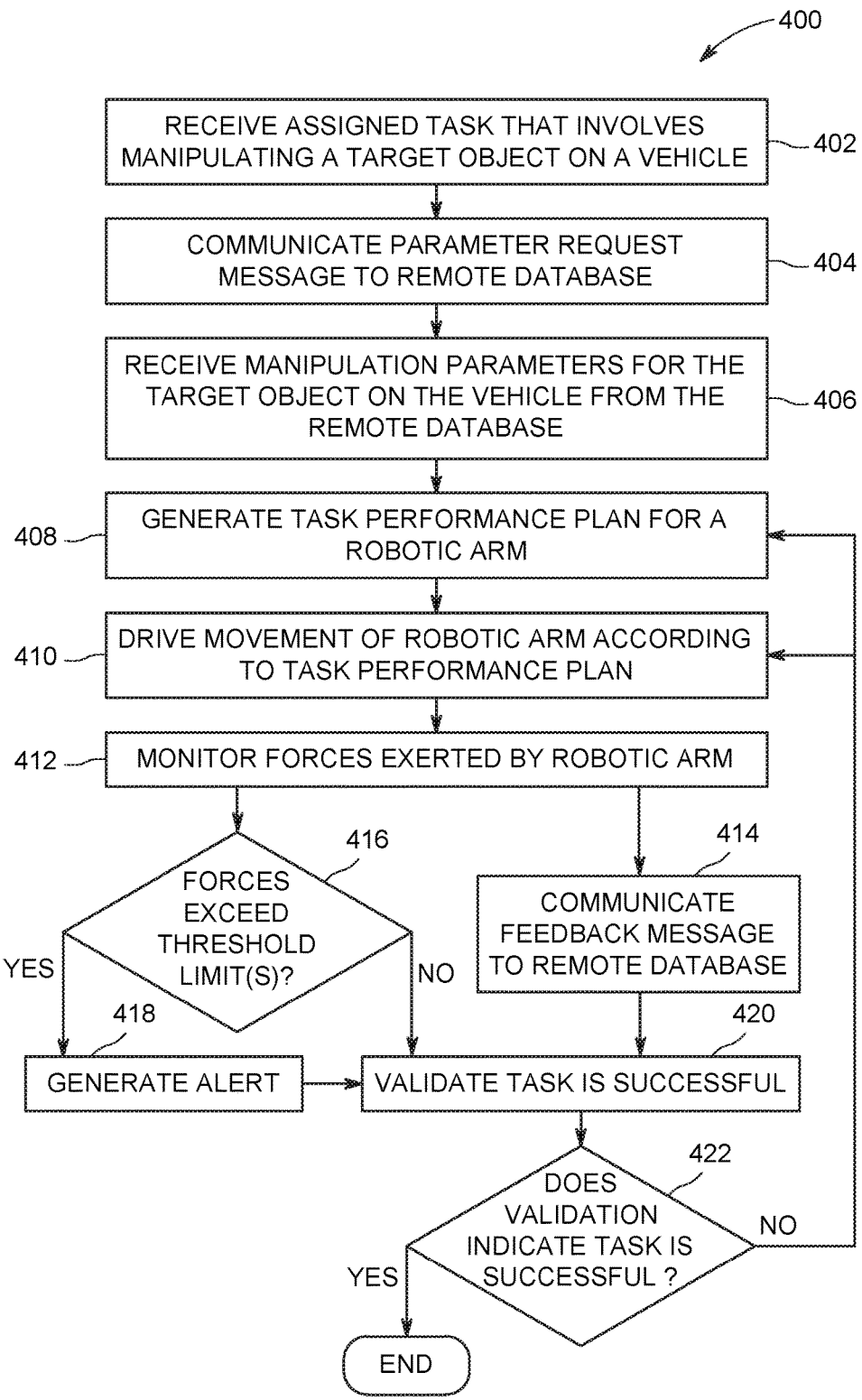
FIG. 5 illustrates a flowchart of one embodiment of a method for performing a task on a vehicle that involves a robotic arm engaging and manipulating a target object on the vehicle.

FIG. 5 illustrates a flowchart of one embodiment of a method 400 for performing a task on a vehicle that involves a robotic arm engaging and manipulating a target object on the vehicle. The method 400 may be performed by one or more embodiments of the robotic machine assembly 102 (shown in FIG. 1) described herein. At 402, an assigned task is received that involves manipulating a target object on a vehicle. Some examples of assigned tasks include bleeding the air brakes of a rail car, setting or releasing a hand brake system of a rail car, and connecting or disconnecting a rail car to another rail vehicle. The target objects may be brake levers, brake wheels, mechanical couplers, or the like. The task may be assigned to the robotic machine assembly via a user-command received at the robotic machine assembly through a user interface device or a communication circuit. The assigned task may be to manipulate the same type of target object on multiple different vehicles in succession, such as pulling the brake lever on each of multiple rail cars in a train.

At 404, a parameter request message is communicated to a remote database. The remote database may be the database 236 of the memory device 232 shown in FIG. 3. The parameter request message identifies at least one of the target object, the vehicle, or a vehicle class in which the vehicle belongs. At 406, manipulation parameters for the target object on the vehicle are received from the remote database. The manipulation parameters may be received in a task parameter message. The manipulation parameters are specific to at least one of the vehicle or a vehicle class in which the vehicle belongs. For example, the manipulation parameters may include a location of the target object relative to the vehicle, a shape of the target object, a size of the target object, a material of the target object, an identification of a contact portion of the target object, a position of the target object, an orientation of the target object, an actuation direction for manipulating the target object, an actuation distance for manipulating the target object, an actuation speed for manipulating the target object, and/or an actuation force for manipulating the target object. The manipulation parameters optionally may include an upper threshold limit for the actuation distance that the robotic arm moves the target object, the actuation force exerted by the robotic arm on the target object to manipulate the target object, and/or the actuation speed at which the robotic arm moves the target object.

At 408, a task performance plan for the robotic arm is generated. The task performance plan is generated based on the manipulation parameters received from the remote database. The task performance plan includes prescribed forces to be exerted by the robotic arm on the target object to manipulate the target object during the performance of the task. At 410, movement of the robotic arm is driven according to the task performance plan. The robotic arm may be driven to approach the target object, orient an end effector of the robotic arm relative to a perceived orientation of the target object, engage the target object, and then move the target object to manipulate the target object. For example, the robotic arm may pull a target object that is a brake lever, and may rotate a target object that is a brake wheel.

At 412, the forces exerted by the robotic arm as the robotic arm moves are monitored. The forces may be monitored by one or more force sensors on the robotic arm. The force sensors may measure an actuation force that is applied by the robotic arm on the target object to move the target object. At 414, a feedback message is communicated to the remote database. The feedback message includes data parameters representing the forces exerted by the robotic arm on the target object during the performance of the assigned task. The data parameters in the feedback message may be compared to the manipulation parameters stored in the database to determine whether the database should be updated using the data parameters communicated in the feedback message.

In addition to, or instead of, communicating the feedback message to the remote database at 414, a determination is made at 416 whether the monitored forces exerted by the robotic arm exceed any upper threshold limits, such as the upper threshold limit for the actuation distance that the robotic arm moves the target object. The upper threshold limits may be received at the robotic machine assembly from the remote database. If the determination indicates that at least one force exerted by the robotic arm on the target object exceeds a corresponding upper threshold limit, flow of the method 400 continues to 418, and an alert is generated. The alert may be configured to notify an operator near the robotic machine assembly or in a remote control center that the vehicle, the target object, and/or the robotic machine assembly may require maintenance. If none of the upper threshold limits are exceeded, the method 400 proceeds to 420.

At 420, the success of the task is validated. For example, for a task to bleed air brakes, the validation includes verifying that the valve of the air brake system has been sufficiently opened such that a sufficient amount of air has been released from the air brake system to allow the brakes to move to a released state. Validation may be accomplished by various methods, including audibly recording the release of air, detecting movement of the brakes to the release state, monitoring a pressure in a conduit of the air brake system, using the encoder to detect that the robotic arm has moved the lever to a designated location, using the force sensor to detect the force exerted on the brake lever, and the like. At 422, a determination is made whether the validation indicates that the task is successful. If the validation indicates that the task has been successfully completed, such that an air brake has been released, a hand brake has been set or released, or a coupler has been connected or disconnected to another vehicle, flow of the method 400 ends. As a result, the robotic machine assembly may move to another vehicle to perform the same task again. If instead the validation indicates that the task has not been released properly, flow of the method 400 may return to step 408 to update the task performance plan or may return to step 410 to drive movement of the robotic arm according to the same task performance plan. Optionally, the robotic machine assembly may provide an alert or notification to an operator or system. The robotic machine assembly may send the alert immediately or after designated number of failed attempts to successfully perform the task.

In one embodiment, a robotic machine assembly includes a movable robotic arm configured to perform an assigned task that involves moving toward, engaging, and manipulating a target object of a vehicle. The assembly also includes a communication circuit configured to receive manipulation parameters for the target object from a remote database. The manipulation parameters are specific to at least one of the vehicle or a vehicle class in which the vehicle belongs. The assembly also includes one or more processors communicatively coupled to the communication circuit and the robotic arm. The one or more processors are configured to generate a task performance plan for the robotic arm based on the manipulation parameters. The task performance plan includes prescribed forces to be exerted by the robotic arm on the target object to manipulate the target object. The one or more processors also are configured to drive movement of the robotic arm during performance of the assigned task according to the task performance plan.

In one example, the manipulation parameters for the target object can include one or more of a location of the target object relative to the vehicle, a shape of the target object, a size of the target object, a material of the target object, an identification of a contact portion of the target object, a position of the target object, an orientation of the target object, an actuation direction for manipulating the target object, an actuation distance for manipulating the target object, and/or an actuation force for manipulating the target object.

In one example, the manipulation parameters for the target object can include an upper threshold limit for at least one of an actuation distance that the robotic arm moves the target object, an actuation force exerted by the robotic arm on the target object to manipulate the target object, or an actuation speed at which the robotic arm moves the target object. Responsive to the upper threshold limit being exceeded during performance of the assigned task, the one or more processors are configured to generate an alert.

In one example, the robotic arm has an end effector disposed at a distal end of the robotic arm that includes a claw configured to grasp the target object. The claw has one or more movable fingers to adjust a width of the claw.

In one example, the task performance plan generated by the one or more processors further includes a prescribed approach orientation of the claw of the end effector relative to the vehicle as the robotic arm moves toward the target object prior to manipulating the target object.

In one example, the target object of the vehicle is at least one of a brake lever that is manipulated to open and close a valve of an air brake system of the vehicle, a brake wheel that is rotationally manipulated to set and release a hand brake of the vehicle, and/or a mechanical coupler that is manipulated to connect and disconnect the vehicle relative to another vehicle.

In one example, the one or more processors are configured to generate a parameter request message that is communicated to the remote database by the communication circuit prior to receiving the manipulation parameters for the target object. The parameter request message identifies at least one of the target object, the vehicle, and/or the vehicle class in which the vehicle belongs.

In one example, the assembly also includes a force sensor configured to monitor forces exerted by the robotic arm on the target object of the vehicle during performance of the assigned task. The one or more processors are configured to generate a feedback message that is communicated to the remote database by the communication circuit. The feedback message can include data parameters representative of the forces exerted by the robotic arm on the target object during the assigned task as monitored by the force sensor.

In one example, the manipulation parameters for the target object can include an actuation force to be exerted by the robotic arm on the target object to manipulate the target object. The actuation force manipulation parameter can be based on historical records of at least one of measured forces exerted on the target object of the vehicle and/or measured forces exerted on other objects similar to the target object disposed on other vehicles in the vehicle class of the vehicle.

In one example, the assembly also includes an imaging sensor disposed on the robotic arm that is positioned to acquire perception information of a working environment that includes the target object. The task performance plan generated by the one or more processors also can include a motion trajectory for the robotic arm that is based on the perception information. The motion trajectory provides a path for the robotic arm to the target object.

In one example, the assigned task can be to release air from an air brake system of the vehicle and the target object is a brake lever that is configured to be moved to open a valve of the air brake system to release the air. The manipulation parameters received from the remote database can include an actuation force parameter and an actuation distance parameter. The one or more processors can drive the movement of the robotic arm such that the robotic arm exerts a pulling force on the brake lever equal to the actuation force parameter and moves the brake lever a distance equal to the actuation distance parameter.

In one embodiment, a method includes receiving (at a robotic machine assembly from a remote database) manipulation parameters for a target object of a vehicle. The robotic machine assembly is configured to perform an assigned task that involves a robotic arm of the robotic machine assembly engaging and manipulating the target object. The manipulation parameters are specific to at least one of the vehicle or a vehicle class in which the vehicle belongs. The method also includes generating (using one or more processors) a task performance plan for the robotic machine assembly based on the manipulation parameters. The task performance plan includes prescribed forces to be exerted by the robotic arm on the target object to manipulate the target object. The method also includes driving movement of the robotic arm according to the task performance plan to perform the assigned task.

In one example, the manipulation parameters for the target object can include one or more of a location of the target object relative to the vehicle, a shape of the target object, a size of the target object, a material of the target object, an identification of a contact portion of the target object, a position of the target object, an orientation of the target object, an actuation direction for manipulating the target object, an actuation distance for manipulating the target object, and/or an actuation force for manipulating the target object.

In one example, the method also can include monitoring forces exerted by the robotic arm on the target object of the vehicle during the performance of the assigned task and subsequently generating a feedback message to be communicated to the remote database. The feedback message can include data parameters representative of the forces exerted by the robotic arm on the target object during the assigned task.

In one example, the method can include, prior to receiving the manipulation parameters, generating a parameter request message to be communicated to the remote database. The parameter request message can identify at least one of the target object, the vehicle, and/or the vehicle class in which the vehicle belongs.

In one example, the manipulation parameters for the target object can include an upper threshold limit for at least one of an actuation distance that the robotic arm moves the target object, an actuation force exerted by the robotic arm on the target object to manipulate the target object, or an actuation speed at which the robotic arm moves the target object. The method also can include generating an alert responsive to the upper threshold limit being exceeded during performance of the assigned task.

In one embodiment, a control system includes a robotic machine assembly including a movable robotic arm, a communication circuit, and one or more processors. The robotic arm is configured to perform an assigned task that involves moving toward, engaging, and manipulating a target object of a vehicle. The system also can include a memory device disposed remote from the robotic machine assembly and the vehicle. The memory device includes a database that stores manipulation parameters for the target object. The manipulation parameters are specific to at least one of the vehicle and/or a vehicle class in which the vehicle belongs. Prior to performing the assigned task, the communication circuit of the robotic machine assembly is configured to receive the manipulation parameters for the target object from the memory device. The one or more processors are configured to control movement of the robotic arm during the performance of the assigned task on the vehicle based on the manipulation parameters received from the memory device.

In one example, the one or more processors can be configured to generate a task performance plan for the robotic arm based on the manipulation parameters. The task performance plan can include prescribed forces to be exerted by the robotic arm on the target object to manipulate the target object. The one or more processors can control the movement of the robotic arm during the performance of the assigned task according to the task performance plan.

In one example, prior to receiving the manipulation parameters from the digital memory device, the one or more processors can be configured to generate a parameter request message that is communicated to the memory device by the communication circuit. The parameter request message can identify at least one of the target object, the vehicle, and/or the vehicle class in which the vehicle belongs. The memory device (or the one or more processors) can select the manipulation parameters to be communicated to the robotic machine assembly from a collection of manipulation parameters stored in the database based on the parameter request message.

In one example, the robotic machine assembly also can include a force sensor configured to monitor forces exerted by the robotic arm on the target object of the vehicle during the performance of the assigned task. The one or more processors can be configured to generate a feedback message that is communicated to the memory device by the communication circuit. The feedback message can include data parameters representative of the forces exerted by the robotic arm on the target object during the assigned task as monitored by the force sensor.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A robotic machine assembly comprising:
a movable robotic arm configured to perform an assigned task that involves moving toward, engaging, and manipulating a target object of a vehicle;
a communication circuit configured to receive manipulation parameters for the target object from a cloud based remote database, the manipulation parameters being specific to at least one of the vehicle or a vehicle class in which the vehicle belongs, wherein the manipulation parameters for the target object include an actuation force to be exerted by the robotic arm on the target object to manipulate the target object, and wherein the manipulation parameters are based on historical records of at least one of measured forces exerted on the target object of the vehicle or measured forces exerted on other objects similar to the target object disposed on other vehicles in the vehicle class of the vehicle; and
one or more processors communicatively coupled to the communication circuit and the robotic arm, the one or more processors configured to generate a task performance plan for the robotic arm based on the manipulation parameters, the task performance plan including prescribed forces to be exerted by the robotic arm on the target object to manipulate the target object, the one or more processors further configured to drive movement of the robotic arm during performance of the assigned task according to the task performance plan.

2. The robotic machine assembly of claim 1, wherein the manipulation parameters for the target object include one or more of a location of the target object relative to the vehicle, a shape of the target object, a size of the target object, a material of the target object, an identification of a contact portion of the target object, a position of the target object, an orientation of the target object, an actuation direction for manipulating the target object, and an actuation distance for manipulating the target object.

3. The robotic machine assembly of claim 1, wherein the manipulation parameters for the target object include an upper threshold limit for at least one of an actuation distance that the robotic arm moves the target object, or an actuation speed at which the robotic arm moves the target object, wherein, responsive to the upper threshold limit being exceeded during performance of the assigned task, the one or more processors are configured to generate an alert.

4. The robotic machine assembly of claim 1, wherein the robotic arm has an end effector disposed at a distal end of the robotic arm, the end effector including a claw configured to grasp the target object, the claw having one or more movable fingers to adjust a width of the claw.

5. The robotic machine assembly of claim 4, wherein the task performance plan generated by the one or more processors further includes a prescribed approach orientation of the claw of the end effector relative to the vehicle as the robotic arm moves toward the target object prior to manipulating the target object.

6. The robotic machine, assembly of claim 1, wherein the target object of the vehicle is at least one of a brake lever that is manipulated to open and close a valve of an air brake system of the vehicle, a brake wheel that is rotationally manipulated to set and release a hand brake of the vehicle, or a mechanical coupler that is manipulated to connect and disconnect the vehicle relative to another vehicle.

7. The robotic machine assembly of claim 1, wherein the one or more processors are configured to generate a parameter request message that is communicated to the cloud based remote database by the communication circuit prior to receiving the manipulation parameters for the target object, the parameter request message identifying at least one of the target object, the vehicle, or the vehicle class in which the vehicle belongs.

8. The robotic machine assembly of claim 1, further comprising a force sensor configured to monitor forces exerted by the robotic arm on the target object of the vehicle during performance of the assigned task, the one or more processors configured to generate a feedback message that is communicated to the cloud based remote database by the communication circuit, the feedback message including data parameters representative of the forces exerted by the robotic arm on the target object during the assigned task as monitored by the force sensor.

9. The robotic machine assembly of claim 1, further comprising an imaging sensor disposed on the robotic arm, the imaging sensor positioned to acquire perception information of a working environment that includes the target object, the task performance plan generated by the one or more processors further including a motion trajectory for the robotic arm that is based on the perception information, the motion trajectory providing a path for the robotic arm to the target object.

10. The robotic machine assembly of claim 1, wherein the assigned task is to release air from an air brake system of the vehicle and the target object is a brake lever that is configured to be moved to open a valve of the air brake system to release the air, the manipulation parameters received from the cloud based remote database including an actuation force parameter and an actuation distance parameter, the one or more processors driving the movement of the robotic arm such that the robotic arm exerts a pulling force on the brake lever equal to the actuation force parameter and moves the brake lever a distance equal to the actuation distance parameter.

11. A method comprising:
receiving, at a robotic machine assembly from a cloud based remote database, manipulation parameters for a target object of a vehicle, the robotic machine assembly configured to perform an assigned task that involves a robotic arm of the robotic machine assembly engaging and manipulating the target object, the manipulation parameters being specific to at least one of the vehicle or a vehicle class in which the vehicle belongs, wherein the manipulation parameters for the target object include an actuation force to be exerted by the robotic arm on the target object to manipulate the target object, and wherein the manipulation parameters are based on historical records of at least one of measured forces exerted on the target object of the vehicle or measured forces exerted on other objects similar to the target object disposed on other vehicles in the vehicle class of the vehicle;
generating, using one or more processors, a task performance plan for the robotic machine assembly based on the manipulation parameters, the task performance plan including prescribed forces to be exerted by the robotic arm on the target object to manipulate the target object; and driving movement of the robotic arm according to the task performance plan to perform the assigned task.

12. The method of claim 11, wherein the manipulation parameters for the target object include one or more of a location of the target object relative to the vehicle, a shape of the target object, a size of the target object, a material of the target object, an identification of a contact portion of the target object, a position of the target object, an orientation of the target object, an actuation direction for manipulating the target object, and an actuation distance for manipulating the target object.

13. The method of claim 11, further comprising monitoring forces exerted by the robotic arm on the target object of the vehicle during the performance of the assigned task and subsequently generating a feedback message to be communicated to the cloud based remote database, the feedback message including data parameters representative of the forces exerted by the robotic arm on the target object during the assigned task.

14. The method of claim 11, further comprising, prior to receiving the manipulation parameters, generating a parameter request message to be communicated to the cloud based remote database, the parameter request message identifying at least one of the target object, the vehicle, or the vehicle class in which the vehicle belongs.

15. The method of claim 11, wherein the manipulation parameters for the target object include an upper threshold limit for at least one of an actuation distance that the robotic arm moves the target object, or an actuation speed at which the robotic arm moves the target object, and wherein, responsive to the upper threshold limit being exceeded during performance of the assigned task, the method further includes generating an alert.

16. A control system comprising:
a robotic machine assembly including a movable robotic arm, a communication circuit, and one or more processors, the robotic arm configured to perform an assigned task that involves moving toward, engaging, and manipulating a target object of a vehicle; and
a memory device disposed remote from the robotic machine assembly and the vehicle, the memory device including a cloud based database that stores manipulation parameters for the target object, the manipulation parameters being specific to at least one of the vehicle or a vehicle class in which the vehicle belongs, wherein the manipulation parameters for the target object include an actuation force to be exerted by the robotic arm on the target object to manipulate the target object, and wherein the manipulation parameters are based on historical records of at least one of measured forces exerted on the target object of the vehicle or measured forces exerted on other objects similar to the target object disposed on other vehicles in the vehicle class of the vehicle;
wherein, prior to performing the assigned task, the communication circuit of the robotic machine assembly is configured to receive the manipulation parameters for the target object from the memory device, the one or more processors configured to control movement of the robotic arm during the performance of the assigned task on the vehicle based on the manipulation parameters received from the memory device.

17. The control system of claim 16, wherein the one or more processors are configured to generate a task performance plan for the robotic arm based on the manipulation parameters, the task performance plan including prescribed forces to be exerted by the robotic arm on the target object to manipulate the target object, the one or more processors controlling the movement of the robotic arm during the performance of the assigned task according to the task performance plan.

18. The control system of claim 16, wherein, prior to receiving the manipulation parameters from the digital memory device, the one or more processors are configured to generate a parameter request message that is communicated to the memory device by the communication circuit, the parameter request message identifying at least one of the target object, the vehicle, or the vehicle class in which the vehicle belongs, the memory device selecting the manipulation parameters to be communicated to the robotic machine assembly from a collection of manipulation parameters stored in the cloud based database based on the parameter request message.

19. The control system of claim 16, wherein the robotic machine assembly further includes a force sensor configured to monitor forces exerted by the robotic arm on the target object of the vehicle during the performance of the assigned task, the one or more processors configured to generate a feedback message that is communicated to the memory device by the communication circuit, the feedback message including data parameters representative of the forces exerted by the robotic arm on the target object during the assigned task as monitored by the force sensor.

20. The robotic machine assembly of claim 1, wherein the or more processors are configured for updating the manipulation parameters in the cloud based remote database.

* * * * *